United States Patent
Bäbler

(10) Patent No.: US 6,406,533 B2
(45) Date of Patent: Jun. 18, 2002

(54) 6,13-DIHYDROQUINACRIDONE DERIVATIVES

(75) Inventor: Fridolin Bäbler, Hockessin, DE (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/801,306

(22) Filed: Mar. 7, 2001

Related U.S. Application Data

(62) Division of application No. 09/496,493, filed on Feb. 2, 2000, now Pat. No. 6,225,472.
(60) Provisional application No. 60/118,419, filed on Feb. 2, 1999.

(51) Int. Cl.$^7$ .................. C09B 48/00; C02D 471/04
(52) U.S. Cl. .................. 106/495; 546/49; 546/56; 546/57; 544/300; 544/361; 544/125; 106/497
(58) Field of Search .................. 166/495, 497; 546/49, 56, 57; 544/125, 300, 361

(56) References Cited

U.S. PATENT DOCUMENTS

| 3,386,843 | A |   | 6/1968 | Jaffe et al. | 106/288 |
| 5,194,088 | A |   | 3/1993 | Bäbler et al. | 106/412 |
| 5,424,429 | A |   | 6/1995 | Hendi et al. | 546/49 |
| 5,755,873 | A |   | 5/1998 | Badejo et al. | 106/497 |
| 5,840,901 | A |   | 11/1998 | Bäbler | 546/49 |
| 6,225,472 | B1 | * | 5/2001 | Babler | 546/49 |
| 6,264,733 | B1 | * | 7/2001 | Babler | 106/495 |

FOREIGN PATENT DOCUMENTS

| EP | 0 643 110 | 3/1995 |
| EP | 0 685 530 | 12/1995 |
| GB | 1544839 | 4/1979 |
| JP | 61-168666 | 7/1986 |
| JP | 6-145546 | 5/1994 |
| WO | 98/41582 | 9/1998 |

* cited by examiner

*Primary Examiner*—C. S. Aulakh
(74) *Attorney, Agent, or Firm*—David R. Crichton

(57) ABSTRACT

A 6,13-dihydroquinacridone derivative of formula I:

$$(MO_3S)_m\text{—}Q\text{—}[CH_2\text{—}(X)\text{—}(Y)_n]_o \quad (I)$$

wherein:

Q represents a 6,13-dihydroquinacridone moiety of formula II;

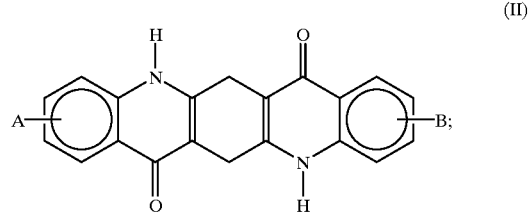

(II)

A and B each independently represent a substituent selected from H, F, Cl, $C_1$-$C_3$alkyl and $C_1$-$C_3$alkoxy M represents a metal cation, quaternary N cation or H;

X is an aromatic group, a cyclo-hetero aliphatic group with at least one 5 or 6 atom ring or a hetero aromatic group with at least one 5 or 6 atom ring and which is not a phthalimido group;

Y is a sulfonic or carboxylic acid or salt thereof;

m and n independently from each other are numbers from zero to 2.5; and o is a number from zero to 4, wherein m and o are not zero simultaneously.

23 Claims, No Drawings

6,13-DIHYDROQUINACRIDONE DERIVATIVES

This application is a division of Ser. No. 09/496,493 filed Feb. 2, 2000, now U.S. Pat. No. 6,225,472, which claims benefit of Provisional application Ser. No. 60/118,419, filed Feb. 2, 1999.

FIELD OF THE INVENTION

The present invention relates to novel compounds which can direct and control the growth and/or crystal phase of pigment particles. Such compounds are particularly useful when present during the synthesis or finishing of an organic pigment.

BACKGROUND OF THE INVENTION

Dihydroquinacridones are intermediates for the production of the well known quinacridone pigments like C.I. Pigment Violet 19, C.I. Pigment Red 202 and C.I. Pigment Red 122.

A number of patents describe processes for the direct synthesis of pigments in a pigmentary form to avoid the additional expensive and oftentimes environmentally unfriendly pigment finishing processes (e.g. processes for particle size reduction and/or crystal-form modification). For example, European Patent No. 643,110 and U.S. Pat. No. 5,424,429 describe a direct synthesis of quinacridone solid solutions and 2,9-dichloroquinacridone in pigmentary form, respectively, in the presence of quinacridone phthalimidomethyl derivatives. European Patent No. 685,530 describes the direct synthesis of pigmentary grade dioxazine in the presence of a dioxazine derivative.

It is also known that sulfonic acid derivatives of certain pigments can effectively diminish the crystal growth during the isolation of the pigment from a reaction mixture. Such sulfonic acid derivatives are described, for example, in U.S. Pat. No. 3,386,843. Other patents describe the use of sulfonic acid derivatives of pigments to stabilize against recrystallization and change of crystal modification as, for example, in G.B. Patent No. 1,544,839 which is directed to phthalocyanine pigments.

U.S. Pat. No. 5,755,873 describes a method for the preparation of quinacridone pigments in which a quinacridone derivative is incorporated during synthesis and copending provisional application Ser. No. 60/087,773 describes a direct synthesis of pigmentary diketopyrrolopyrrole pigments in the presence of quinacridone or diketopyrrolopyrrole derivatives.

Although the addition of such known pigment derivatives can be advantageous, pigment synthesis in the presence of such derivatives in many cases does not provide the favored pigmentary crystal size, shape or crystal modification.

Copending U.S. Provisional Patent Application entitled "PIGMENT PARTICLE GROWTH AND/OR CRYSTAL PHASE DIRECTORS", of the present inventor filed Feb. 2, 1999, discloses pigment particle growth and/or crystal phase directors which in many cases allow for the direct synthesis of pigmentary pigments without requiring a finishing step. However, these compounds themselves have coloristic properties and when used with certain pigments can behave as colored impurities and/or can reduce the saturation of the final pigment.

Japanese Patent No. 061 45 546 describes phthalimidomethyl dihydroquinacridones and the use thereof as pigment dispersants.

SUMMARY OF THE INVENTION

The present invention is based on the discovery that new, colorless or only slightly colored compounds derived from 6,13-dihydroquinacridone are effective pigment particle growth controller and crystal phase directors when present during the pigment synthesis or a pigment finishing step. They are particularly effective for quinacridone and diketopyrrolo pyrrole pigments.

Such 6,13-dihydroquinacridone derivatives can be prepared by simple synthesis procedures and offer the pigment manufacturer a means to prepare a pigment providing the preferred color characteristic without requiring an additional pigment finishing step.

Since other known particle growth inhibitors which are derived from pigment derivatives are strongly colored and often can behave as an impurity, the present 6,13-dihydroquinacridone derivatives are only slightly colored. Their presence will not particularly change the hue of the pigment. Furthermore, the present 6,13-dihydroquinacridones derivatives are non planar molecules. Based on the state of the art it is unexpected that non planar molecules can act as particle growth inhibitors and crystal phase directors for pigment crystals composed of planar organic pigment molecules. Thus, the inventive compounds allow the manufacturer to produce high performance, high chroma organic pigments in an economical and environmentally friendly manner and therefore, are of extreme commercial importance.

DETAILED DESCRIPTION OF A PREFERRED EMBODIMENT

The present invention relates to novel compounds of formula I:

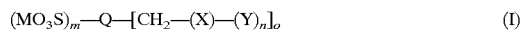

wherein Q represents a 6,13-dihydroquinacridone moiety of formula II:

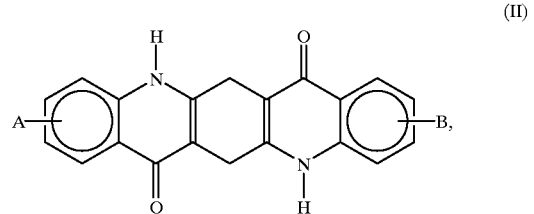

wherein A and B each independently represent a substituent selected from H, F, Cl, $C_1$-$C_3$alkyl and $C_1$-$C_3$alkoxy. Preferably, substituents A and B each represent hydrogen.

M of formula I represents a metal cation, quaternary N cation or hydrogen, X represents an aromatic group or a cyclo hetero aliphatic group with at least one 5 or 6 atom ring or a hetero aromatic group with at least one 5 or 6 atom ring and which is not a phthalimido group; Y is a sulfonic or carboxylic acid or salt thereof, m and n independent of one of the other each are numbers from zero to 2.5, and o is a number from zero to 4, wherein m and o are not zero simultaneously.

The present invention is further directed to a process for the preparation of compounds of formula (I) and to the use thereof.

Preferably, m in formula I represents a number from zero to 2 and most preferably zero to 1; n represents preferably a number from zero to 2 and most preferably from zero to 1.2, and o represents preferably a number from zero to 2 and most preferably from zero to 1.5, wherein m and o are not zero simultaneously. The values for m, n and o are determined by analytical methods like mass spectrometry such as LCMS, GCMS or the matrix-assisted laser desorption ionization technique (MALDI).

The metal cation M of formula I is preferably sodium, potassium, calcium, magnesium or aluminum, and the quaternary N cation of formula I is an ammonium or an alkyl ammonium group.

Typically, the group X of the inventive compound of formula I is an aromatic group with a 5 carbon or a 6 carbon ring or a polycyclic group containing two to six fused 5 carbon and/or 6 carbon rings; a cyclo-hetero aliphatic group including at least one 5 or 6 atom ring or fused 5 and/or 6 atom rings, or a hetero aromatic group which is not a phthalimido group, containing a 5 or 6 atom ring or fused 5 and/or 6 atom rings, and in which there are 1 to 4 hetero atoms of N, S and/or O.

Suitable aromatic groups include, for example, phenylene, naphthalene, acenaphthylene, anthracene, phenanthrene, naphthacene, chrysene, pyrene or perylene. Preferably the aromatic group is phenylene, naphthalene, anthracene or pyrene, and most preferably the aromatic group is phenylene or naphthalene.

Cyclo-hetero aliphatic groups are, for example, pyrrolidine, imidazolidine, piperidine, piperazine or morpholine.

Appropriate hetero aromatic groups are, for instance, pyridine, pyrazine, pyrimidine, pyridazine, isoindole, quinoline, isoquinoline, carbazole, phenothiazine, benzimidazolone, benzothiazole, pyrrolo, imidazole or pyrazole.

The above exemplified aromatic, cyclo hetero aliphatic or hetero aromatic groups can optionally be substituted with one or more halogen, oxy, hydroxy, imino, amino and/or $C_{1-C18}$alkyl groups, preferably $C_{1-C3}$alkyl or $C_{1-C3}$alkoxy groups.

Examples of the large number of such substituted cyclo hetero aliphatic or hetero aromatic groups are, for instance, toluene, ortho-, meta- or para-xylene, chlorobenzene, 1- or 2-methyinaphthalene or anthraquinone, barbituric acid, melamine, 1,3,7-trimethylxanthin, hydantoin, 2-methylbenzimidazole, 2,6,8-trihydroxypurine, 1,8-naphtosultam, o-benzoic acid sulfimide or 2,4-dihydroxyprimidine.

Commonly, the group Y is a carboxylic acid or a sulfonic acid group. Most preferably the group Y is a free sulfonic acid or a sodium, potassium, magnesium, calcium, aluminum, quaternary ammonium or alkyl ammonium salt thereof.

A further embodiment, as described more fully below, of the present invention is a process for the preparation of compounds of formula I, wherein:

a) the moiety Q is dissolved in concentrated sulfuric acid;
b) the intermediate X is added into the solution and dissolved at a temperature below 50° C.;
c) para-formaldehyde is added at a temperature below 50° C.;
d) and then is heated to a temperature from to 50 to 100° C.; and
e) then isolated.

The inventive 6,13-dihydroquinacridone derivatives are prepared, for example, by reacting a 6,13-dihydroquinacridone moiety of formula II and the intermediate X, a substantial portion of which is the moiety of group X, with formaldehyde. Preferably the reaction is carried out in concentrated (95–98%) sulfuric acid. In one preferred method, the 6,13-dihydroquinacridone of the moiety Q is dissolved in concentrated sulfuric acid at a concentration of about 5 to 30 weight percent, most preferably about 10 to 20 weight percent at a temperature below about 50° C., preferably at about 35 to 45° C. The intermediate X is added to the 6,13-dihydroquinacridone solution at a temperature below about 50° C., preferably at about 35 to 45° C. and is also dissolved. Finally, the formaldehyde is added, preferably in the form of para-formaldehyde, at a temperature below about 50° C., more preferably at about 35 to 45° C. The reaction mixture is heated to a temperature from about 50 to 100° C. and stirred at that temperature until the reaction is complete, preferably for about 30 minutes to 6 hours, most preferably from about 30 to 90 minutes, and drowned into ice water. The resulting slurry is stirred for about 5 minutes to 6 hours, preferably from about 30 minutes to 3 hours, at a temperature of from about 0 to 50° C., preferably from about 10 to 25° C. The inventive 6,13-dihydroquinacridone derivatives are then isolated by filtration or centrifugation and are preferably washed with water. The resulting product cake can be dried or can be used in the form of an aqueous cake as an additive during the pigment synthesis.

In general, a stochiometric amount of the 6,13-dihydroquinacridone moiety of formula II, intermediate X and formaldehyde are used; however, an excess of the intermediate X or formaldehyde may be used to achieve the desired product. Preferably, the molar ratio of the 6,13-dihydroquinacridone:intermediate X:formaldehyde is 1:1 to 1.2:1 to 2.

If a high degree of sulfonation is desired, the reaction mixture is stirred at higher temperature, for example above 60° C. If it is desirable to have a low degree of sulfonation, the reaction is maintained at lower temperature, for example below 60° C.

The isolated samples can be analyzed by known methods, for example, by elementary analysis or mass spectrometry such as LCMS, GCMS or the matrix-assisted laser desorption ionization technique (MALDI) or by the HPLC method, all of which are well known to those of ordinary skill in the art. By the above preferred technical preparation method, which does not include specific cleaning steps, the purity of the isolated product is generally not 100% and the product contains, depending on the starting materials and reaction temperature, some remaining starting materials or other byproducts which, when in concentrations that do not impact the effect of the particle size and phase director, are tolerated and can actually provide additional advantageous effects. By technically well known methods, such as solvent treatments, recrystallization or precipitation from basic polar solvent solutions, for example in basic dimethyl sulfoxide or dimethyl formamide, such products can be further purified, if desired.

Generally, the inventive 6,13-dihydroquinacridone derivatives are added at a concentration of about 0.1 to 15 percent, preferably about 0.3 to 10 percent and most preferably about 0.5 to 8 percent by weight, based on the weight of pigment to be synthesized. The inventive 6,13-dihydroquinacridone derivatives can be added before or during the final pigment synthesis step.

The inventive 6,13-dihydroquinacridone derivatives are suitable as an additive for the synthesis of pigments of several pigment classes including pigments of the anthraquinone, phthalocyanine, perinone, perylene, diketopyrrolopyrrole, thioindigo, iminoisoindoline, iminoisoindolinone, quinacridone, flavanthrone, dioxazine, indanthrone, anthrapyrimidine and quinophthalone pigment class. The said derivatives are particularly suited for pigments of various pigment classes having different shades because they themselves are only slightly colored and therefore, the presence of the inventive compounds does not lower the saturation or change the hue of the pigment.

The inventive 6,13-dihydroquinacridone derivatives are especially suitable for the synthesis of direct pigmentary diketo pyrrolopyrrole and quinacridone pigments and/or its solid solutions. Said derivatives are highly suitable for the synthesis of quinacridone pigments in their specific crystal modifications such as the alpha, beta or gamma quinacridone, 2,9-dichloroquinacridone, 2,9-dimethylquinacridone, 4,11-dichloroquinacridone and solid solutions thereof. The inventive 6,13-dihydroquinacridone derivatives are particularly effective, when they are completely or partially soluble in the reaction media in which the pigment is being synthesized.

Accordingly, a further embodiment of the present invention concerns a process for the preparation of a direct pigmentary diketopyrrolopyrrole or quinacridone pigment or a solid solution thereof comprising the step of synthesizing said pigment or solid solution in the presence of 0.5 to 8 percent by weight of a 6,13-dihydroquinacridone of formula I, based on the pigment being synthesized.

Without limiting this invention to any particular theory, it is believed that the inventive 6,13-dihydroquinacridone derivatives molecule is adhered to the synthesized pigment molecule and by this is directing the crystal growth and crystal phase. The term "directing the crystal growth" refers to controlling the synthesis of pigment particles having a pigmentary size as well as directing the growth of the crystals to generate particles of a specific desirable shape such as platelet, needle, cubic, leaflet, rod and other geometric forms, in a desirable crystal phase. The effect can be influenced by the chemical structure of the organic pigment, the selection of the reaction media, the pigment synthesis procedure, the concentration and the chemical structure of the inventive 6,13-dihydroquinacridone derivatives.

Under circumstances in which the reaction media of the pigment to be synthesized is oxidative, the inventive 6,13-dihydroquinacridone derivative may be partially or completely oxidized to the corresponding quinacridone derivative during the pigment synthesis. Therefore, the inventive 6,13-dihydroquinacridone derivatives are particularly useful for the quinacridone pigment synthesis when the quinacridone pigment is obtained by the oxidation of the corresponding 6,13-dihydroquinacridone as described, for example, in U.S. Pat. No. 5,840,901.

During the isolation of the pigment, for example in the filtration step, these 6,13-dihydroquinacridone derivatives—when soluble in the reaction media—can be washed out and if desirable, be recollected from the filtrate or wash liquid. Typically, these compounds are partially left on the pigment surface and can have additional benefits. Such benefits are, for example, improved pigment properties such as rheological properties, dispersibility and wetting behavior, flocculation resistance and improved heat stability.

Additionally, it has been found that phthalimidomethyl dihydroquinacridone, previously described as a pigment dispersant, can be an effective pigment particle growth controller and pigment crystal phase director.

In certain cases, it is advantageous to use the inventive 6,13-dihydro-quinacridone derivatives in mixture or in combination with other additives including known pigment particle growth inhibitors such as, for example, the compounds described in Copending U.S. Provisional Patent Application entitled "PIGMENT PARTICLE GROWTH AND/OR CRYSTAL PHASE DIRECTORS", or phthalimidomethyl-, imidazolmethyl- or pyrazolmethyl-quinacridone, pigment sulfonic acids, specific polymers or other optional ingredients such as wetting agents, surfactants, defoamers, antioxidants, UV absorbers, light stabilizers, plastisizers, or general texture improving agents and so forth. Any such additional additives may be used as long as such additives are stable under the pigment synthesis conditions and have no negative impact on the final pigment properties or the environment. Generally, such additives can be added in a concentration of 0.1 to 25 percent, preferably 0.2 to 15 percent and most preferably 0.5 to 8 percent by weight, based on the weight of pigment to be synthesized. The resulting pigment/additive mixture can be used in any conventional pigment application, such as in the formation of paints, inks, color filters, fibers, paper or textiles.

Suitable polymers are, for example, polyacrylic acid, polymethacrylic acid, polyvinylpyrrolidone, polymaleic anhydride, polyurethane, polyvinylether, polyvinylalcohol, polyalkylene glycol, polyethylene oxide, cellulose derivatives, polyimine, polyvinylpyridine, or copolymers such as copolymers of acrylic acid with styrene, acrylonitrile, vinylacetate, vinylphosphonate, vinylpropionate, vinylchloride, itaconic acid or maleic anhydride, or a mixture thereof, or polymeric derivatives like ethoxylated or propoxylated fatty amines such as ethoxylated cocoalkyl, oleyl or soy-alkyl amines; ethoxylated or propoxylated fatty quaternary salts such as ethoxylated cocoalkyltrimethyl ammonium chloride; ethoxylated fatty amides such as ethoxylated oleamides; alkyl-, cycloalkyl- or alkylaryl-oxypoly(ethylenoxy)ethanol, cycloalkyloxypoly(ethylenoxy)laurate or oleate, polyethylene glycol 400 laurate or oleate, alkyl-, cycloalkyl- or alkylaryl-poly(ethylenoxy)carboxylate or phosphonate.

Suitable surfactants belong to the group of anionic surfactants like for example the alkylbenzene- or alkylnaphthalene sulfonates, alkylsulfosuccinates or naphthalene formaldehyde sulfonates; the group of cationic surfactants like for example quaternary salts such as benzyl tributyl ammonium chloride; or the group of nonionic or amphoteric surfactants like the polyoxyethylene surfactants or alkyl- or amidopropyl betaines, respectively.

Suitable texture improving agents are for example fatty acids such as stearic acid or behenic acid, and fatty amines such as laurylamine and stearylamine. In addition, fatty alcohols or ethoxylated fatty alcohols, polyols such as aliphatic 1,2-diols or epoxidized soy bean oil, waxes, resin acids and resin acid salts.

Suitable UV stabilizers are for example the known benzotriazol derivatives known under the trade name TINUVIN or CIBA Fast H Liquid an aryl sulfonated benzotriazol, both being products of Ciba Specialty Chemicals Corporation.

Due to the ability to act as an antiflocculant as well as an excellent particle growth inhibitor and phase director, the inventive 6,13-dihydroquinacridone derivatives can generally be used in the pigment finishing, pigment treatment, or pigment application such as an additive during the pigment dispersion step in bead mills, extruder, calendar and so forth, as well as during pigment synthesis.

Pigment finishing processes in which the inventive 6,13-dihydroquinacridone derivatives can be used are for example the known kneading, solvent or aqueous milling processes.

Particularly effective are the inventive 6,13-dihydroquinacridone derivatives when present in pigment finishing processes in which a pigment crude is premilled and after treated in an organic solvent, a process as described for example in the U.S. Pat. Nos. 5,194,088 and 2,857,400.

The following examples further describe the embodiments of the invention, but do not limit the scope of the invention. In the examples, all parts are by weight unless otherwise indicated.

EXAMPLE 1

A one liter flask equipped with a stirrer, thermometer, condenser and drying tube was charged with 200 ml concentrated (95–98%) sulfuric acid. 23.6 grams (0.075 mol) 6,13-dihydroquinacridone were added at a temperature below 45° C. and the resulting solution was heated to 100° C. and stirred for 6 hours at 100° C., then poured into 2.5 liters of ice water. The precipitate was stirred for 30 minutes at room temperature, then filtered. The presscake was then washed with water to a pH of 5 and dried yielding a product in which 6,13-dihydroquinacridone sulfonic acid with the molecular weight of 394 was detected by MALDI.

EXAMPLE 2

A one liter flask equipped with a stirrer, thermometer, condenser and drying tube was charged with 200 ml concentrated (95–98%) sulfuric acid. 47.1 grams (0.15 mol) 6,13-dihydroquinacridone were added at a temperature below 45° C. and the mixture was stirred for 10 minutes at 40 to 45° C., dissolving the 6,13-dihydro-quinacridone completely.

23.2 grams (0.158 mol) phthalimide were added at a temperature below 45° C. and the mixture was stirred for 10 minutes at 40 to 45° C. followed by the rapid addition of 4.9 grams (0.163 mol) of para formaldehyde. The reaction mixture was stirred for one hour at 55–60° C. then poured into 2.5 liters of ice water. The precipitate was stirred for 2½ hours at room temperature, then filtered. The presscake was washed with water to a pH of 6 to 7 and dried yielding a product in which phthalimide methyl 6,13-dihydroquinacridone having a molecular weight of 473 was detected by MALDI.

EXAMPLE 3

The procedure of Example 2 was repeated using 19.2 grams (0.15 mol) barbituric acid instead of phthalimide to yield a product in which barbituric acid methyl 6,13-dihydroquinacridone having a molecular weight of 454 was detected by MALDI.

EXAMPLE 4

The procedure of Example 2 was repeated using 18.9 grams (0.15 mol) melamine instead of phthalimide to yield a product in which melamine methyl 6,13-dihydro quinacridone having a molecular weight of 452 was detected by MALDI.

EXAMPLE 5

The procedure of Example 2 was repeated using 27.6 grams (0.15 mol) o-benzoic acid sulfimide sodium salt instead of phthalimide to yield a product in which o-benzoic acid sulfimide methyl 6,13-dihydro quinacridone having a molecular weight of 509 was detected by MALDI.

EXAMPLE 6

The procedure of Example 2 was repeated using 26.4 grams benzene sulfonic acid (0.15 mol with a content of 90%) instead of phthalimide to yield a product in which para benzene sulfonic acid methyl 6,13-dihydro quinacridone having a molecular weight of 486 was detected by MALDI.

EXAMPLE 7

The procedure of Example 2 was repeated using 30.6 grams Naxonate ST, a commercially available sodium toluene sulfonate from Ruetgers-Naese (0.15 mol sodium toluene sulfonate with a content of 93%) instead of phthalimide to yield a product in which toluene sulfonic acid methyl 6,13-dihydro quinacridone having a molecular weight of 500 was detected by MALDI.

EXAMPLE 8

A one liter flask equipped with a thermometer, stirrer and condenser was charged with 40 grams 6,13-dihydroquinacridone, 250 ml methanol, 52.8 grams 50% aqueous sodium hydroxide and 3.0 grams 50% aqueous benzyl tributyl ammonium chloride. The mixture was stirred under a slow flow of nitrogen at 30 to 45° C. for five minutes, heated to 50 to 55° C. and stirred at 50 to 55° C. for one hour. 0.6 grams of pigment additive melamine methyl dihydroquinacridone prepared according to Example 4 was added, followed by the addition of 0.5 grams anthraquinone mono sulfonic acid sodium salt, as catalyst, and the reaction mixture was heated to reflux. 73 grams of an aqueous 17% hydrogen peroxide solution were added into the reaction mixture with a peristaltic pump at a setting of 0.3 ml/minute maintaining reflux under a slow nitrogen flow. The resulting reddish suspension was further stirred for 10 minutes at reflux then diluted with 100 ml cold water and filtered. The presscake was washed with hot water then dried, yielding 38.9 grams red quinacridone.

The product showed a purity of above 98% quinacridone as determined by a spectrophotometric method. The x-ray diffraction pattern of the pigment shows the characteristics of a gamma type quinacridone. When incorporated into plastics or paints the pigment imparts a red color with excellent properties.

EXAMPLE 9

The procedure of Example 8 was repeated using 0.6 grams dihydroquinacridone sulfonic acid additive prepared according to Example 1 instead of 0.6 grams melamine methyl dihydroquinacridone to yield 39 grams bluish red quinacridone.

The product showed a purity of above 99% quinacridone as determined by a spectrophotometric method. The x-ray diffraction pattern of the pigment shows the characteristics of a beta quinacridone. When incorporated into plastics or paints the pigment imparts a violet reddish color with excellent properties.

EXAMPLE 10

A one liter flask equipped with a thermometer, stirrer and condenser was charged with 40 grams 6,13-dihydroquinacridone, 180 ml methanol, 42.5 grams 50% aqueous sodium hydroxide and 14.6 grams of an aqueous presscake containing 1.6 grams naphthalin-1-sulfonic acid methyl quinacridone pigment additive prepared according to Example 2 of Copending U.S. Provisional Patent Application entitled "PIGMENT PARTICLE GROWTH AND/OR CRYSTAL PHASE DIRECTORS". The mixture was stirred under a slow flow of nitrogen at 50 to 55° C. for one hour. 0.5 grams anthraquinone mono sulfonic acid sodium salt, as catalyst, were added and the reaction mixture was heated to reflux. 67 grams of an aqueous 19.3% hydrogen peroxide solution were added into the reaction mixture with a peristaltic pump at a pumping rate of 0.3 ml/minute, whereby after 15 minutes addition time, 1.2 grams phthalimidomethyl dihydroquinacridone obtained according to Example 2 were added into the reaction mixture followed by another addition of 0.8 grams phthalimidomethyl dihydroquinacridone after 45 minutes while continuously adding the hydrogen peroxide by maintaining reflux and a slow nitrogen flow. The resulting violet suspension was further stirred for 10 minutes at reflux then diluted with 100 ml cold water and filtered. The presscake was washed with hot water, then dried, yielding 38.9 grams violet quinacridone.

The product showed a high purity and only 0.7% 6,13-dihydroquinacridone left as determined by a spectrophotometric method. The x-ray diffraction pattern of the pigment showed the characteristics of a beta quinacridone. The specific surface area determined by the BET method was 50 $m^2/g$.

When incorporated into automotive paints the product produced a strong violet color dispersion with excellent rheological properties and displayed a semitransparent appearance when drawn on a contrast carton, and which could be easily sprayed on metallic panels generating violet coatings of excellent durability.

EXAMPLE 11

A one liter flask equipped with a thermometer, stirrer and condenser was charged with 116.6 grams 45% aqueous potassium hydroxide, 200 ml methanol and 0.8 grams of the phthalimidomethyl dihydroquinacridone additive prepared according to Example 2. The mixture was stirred for 5 minutes at 30 to 40° C. 45 grams 2,9-dichloro-6,13-dihydroquinacridone were added followed by 60 ml methanol and the resulting suspension was stirred under a slow flow of nitrogen at reflux temperature for one hour to generate the potassium salt of 2,9-dichloro-6,13-dihydroquinacridone. 0.6 gram of anthraquinone-2-sulfonic acid, sodium salt, was added. 68 grams of an aqueous 16.9% hydrogen peroxide solution were then added at a pump setting of 0.3 ml/minute while maintaining reflux under a slow nitrogen flow over 3 hours 20 minutes. The resulting magenta colored suspension was further stirred for 10 minutes at reflux temperature, diluted with 100 ml cold water, then filtered at 50 to 60° C. The presscake was washed with hot water and dried yielding 44 grams of magenta-colored 2,9-dichloroquinacridone pigment.

The x-ray diffraction pattern of the pigment showed the characteristics of a gamma 2,9-dichloroquinacridone. The specific surface area as determined by the BET method was 45.2 $m^2g$. incorporated in automotive paints the product produced a strong magenta color dispersion with excellent rheological properties, and which was easily sprayed on metallic panels to generate magenta colored coatings of excellent durability.

EXAMPLE 12

A one liter flask equipped with a thermometer, stirrer and condenser was charged with 40 grams 6,13-dihydroquinacridone, 185 ml methanol, 42 grams 50% aqueous sodium hydroxide and 1.2 grams of the barbituric acid methyl dihydro-quinacridone additive prepared according to Example 3. The mixture was stirred under a slow flow of nitrogen at 50 to 55° C. for one hour. 0.5 gram anthraquinone mono sulfonic acid sodium salt, as catalyst, was added and the reaction mixture was heated to reflux. 67 grams of an aqueous 19.3% hydrogen peroxide solution were added into the reaction mixture with a peristaltic pump at a pumping rate of 0.3 ml/minute while maintaining reflux and a slow nitrogen flow. The resulting violet suspension was further stirred for 10 minutes at reflux, then diluted with 100 ml cold water and filtered. The presscake was washed with hot water then dried, yielding 38.9 grams violet reddish quinacridone.

The product showed a high purity and only 0.1% 6,13-dihydroquinacridone left as determined by a spectrophotometric method. The x-ray diffraction pattern of the pigment showed the characteristics of a beta quinacridone. The specific surface area determined by the BET method was 8 $m^2/g$.

When incorporated into automotive paints the product produced a strong violet reddish color dispersion with excellent rheological properties, displayed an opaque appearance when drawn on a contrast carton, and was easily sprayed on metallic panels to generate violet reddish coatings of excellent durability.

EXAMPLE 13

A one liter flask equipped with a thermometer, stirrer and condenser was charged with 45 grams 2,9-dichloro-6,13-dihydroquinacridone, 136.8 grams 45% aqueous potassium hydroxide, 280 ml methanol, 0.3 gram of the o-benzoic acid sulfimide methyl dihydroquinacridone additive prepared according to Example 5 and 3.4 grams 50% aqueous benzyl tributyl ammonium chloride solution. The mixture was stirred for 5 minutes at 30 to 40° C., then heated to reflux and stirred under a slow flow of nitrogen at reflux temperature for one hour to generate the potassium salt of 2,9-dichloro-6,13-dihydroquinacridone. 0.6 gram of anthraquinone-2-sulfonic acid, sodium salt, was added. 66 grams of an aqueous 17% hydrogen peroxide solution were then added at a pump setting of 0.3 ml/minute while maintaining reflux under a slow nitrogen flow over 3 hours 20 minutes. The resulting magenta colored suspension was further stirred for 10 minutes at reflux temperature, diluted with 100 ml cold water, then filtered at 50 to 60° C. The presscake was washed with hot water and dried yielding 44 grams of magenta-colored 2,9-dichloroquinacridone pigment.

The x-ray diffraction pattern of the pigment showed the characteristics of a gamma 2,9-dichloroquinacridone. The specific surface area as determined by the BET method was 20 $m^2/g$. Incorporated in automotive paints the product produced a strong magenta color dispersion with excellent rheological properties, and which was easily sprayed on metallic panels to generate magenta colored coatings of high opacity and excellent durability.

EXAMPLE 14

A beta quinacridone crude with a particle size of 2 to 6 $\mu m$ as for example obtained by the oxidation of 6,13-dihydroquinacridone with hydrogen peroxide as the oxidant as described in U.S. Pat. No. 5,840,901 is premilled according to the following procedure:

A 1-SDG Attritor™ mill manufactured by Union Process, Inc. Akron, Ohio, which is fitted with L-arms and contains 3.78 liters of 0.6 cm diameter ceramic grinding media with 7.5 MOH hardness, 60-65 Rockwell 45 N hardness, 3.0 kg/cm impact strength and 8500 kg/cm compressive strength. The mill is charged with 350 grams of the beta quinacridone crude and the pigment is milled under a nitrogen flow at a rotation speed of 500 RPM for 50 minutes.

At the conclusion of the milling cycle, the product is recovered by opening the valve at the bottom of the mill while rotation continues for 15 minutes yielding a brown highly aggregated powder with a very low crystallinity.

EXAMPLE 15

A one liter flask equipped with a thermometer, stirrer and condenser was charged with 0.3 grams of the o-benzoic acid sulfimide methyl dihydroquinacridone additive prepared according to Example 5 and 250 ml DMF (dimethylformamide). The mixture was stirred at 50–55° C. for 15 minutes whereby the additive was partially dissolved in the solvent. 30 grams of the above premilled powder is added and the suspension was stirred for 3 hours at 50–55° C. The resulting violet suspension was filtered. The press cake was washed with water and dried yielding a violet pigment which shows excellent durability and a high chroma when incorporated in paints and plastics. The X-ray diffraction pattern shows the characteristic of a beta quinacridone.

EXAMPLE 16A

The procedure of Example 14 was repeated using instead of a beta quinacridone a 3,6-diphenyl -1,4-diketopyrroi-[3,4-c]-pyrrole crude yielding a brownish highly aggregated powder with a very low crystallinity.

EXAMPLE 16B

A one liter flask equipped with a thermometer, stirrer and condenser was charged with 0.5 grams of the toluene sulfenic acid methyl dihydroquinacridone additive prepared according to Example 7 and 230 ml DMSO (dimethylsulfoxide). The mixture was stirred at 50–55° C. for 15 minutes whereby the additive was partially dissolved in the solvent. 20 grams of the premilled powder prepared according to Example 16A was added and the suspension was stirred for 2 hours at 23–25° C. The resulting red suspension was filtered. The press cake was washed with water and dried yielding a scarlet pigment which shows a high color strength, high opacity as well as excellent durability and a high chroma when incorporated in paints and plastics.

EXAMPLE 17A

The procedure of Example 14 is repeated using instead of a beta quinacridone a perylene-3,4,9,10-tetracarbonic acid diimide yielding a dark highly aggregated powder with a very low crystallinity.

EXAMPLE 17B

A one liter flask equipped with a thermometer, stirrer and condenser was charged with 0.2 grams of the benzene sulfenic acid methyl dihydroquinacridone additive prepared according to Example 6 and 250 ml DMSO (dimethylsulfoxide). The mixture was stirred at 50–55° C. for 15 minutes whereby the additive was partially dissolved in the solvent. 20 grams of the premilled powder prepared according to Example 17A were added and the suspension was stirred for 3 hours at 80–90° C. The resulting violet suspension was filtered. The press cake was washed with water and dried yielding a violet pigment which shows a high color strength, excellent durability and a high transparency when incorporated in paints.

EXAMPLE 18

Under a flow of nitrogen a one liter flask equipped with a thermometer, stirrer and condenser is charged with 100 ml tert.-amyl alcohol, 34.6 grams potassium tert. butylate and 144.4 grams of benzonitrile, and the mixture is heated to about 98° C. A substantially anhydrous solution of 14.6 grams of dimethyl succinate in 10 ml tert. amyl alcohol is added at 98–99° C. in 145 minutes using a metering pump and methanol is distilled of. After the complete addition the reaction mixture is stirred for 2 hours at 99° C. and 0.5 grams benzene sulfenic acid methyl dihydroquinacridone additive prepared according to Example 6 are added, then cooled to 65° C., diluted with 100 ml methanol followed by the addition of 250 ml water. The mixture is filtered. The presscake is washed neutral with water and dried, yielding 19 grams of a scarlet direct pigmentary diketopyrrolopyrrole pigment showing a high color strength, high saturation and good light stability when incorporated in paints and plastics.

EXAMPLE 19

63.0 grams of polyvinylchloride, 3.0 grams epoxidized soya bean oil, 2.0 grams of barium/cadmium heat stabilizer, 32.0 grams dioctyl phthalate and 1.0 gram of the beta quinacridone prepared according to Example 10 were mixed together in a glass beaker using a stirring rod. The mixture was formed into a soft PVC sheet with a thickness of about 0.4 mm by rolling for 8 minutes on a two roll laboratory mill at a temperature of 160° C., a roller speed of 25 rpm and friction of 1:1.2 by constant folding, removal and feeding. The resulting soft PVC sheet was colored in an attractive violet shade with excellent fastness to heat, light and migration.

EXAMPLE 20

Five grams of the magenta 2,9-dichloroquinacridone pigment prepared according to Example 13, 2.5 grams hindered amine light stabilizer, 1.0 gram benzotriazole UV absorber, 1.0 gram hindered phenol antioxidant and 1.0 gram phosphite process stabilizer were mixed together with 1000 grams of high density polyethylene at a speed of 175–200 rpm for 30 seconds after flux. The fluxed, pigmented resin was chopped up while warm and malleable, and then fed through a granulator. The resulting granules were molded in an injection molder with a 5 minute dwell time and a 30 second cycle time at temperatures of 260° C. Homogeneously colored chips which show a bright magenta color with excellent light stability were obtained.

EXAMPLE 21

Preparation of Automotive Paint millbase formulation:

A pint jar was charged with 66 grams acrylic resin, 14.5 grams AB dispersant and 58.1 grams solvent (SOLVESSO 100 from American Chemical). 26.4 grams quinacridone pigment obtained according to Example 12 and 980 grams of 4 mm diameter steel diagonal rods were added. The mixture was milled in the jar for 64 hours on a roller mill. The resulting millbase contained 16.0% pigment with a pigment/binder ratio of 0.5 and a total non-volatile content of 48.0%.

masstone color:

47.3 grams of the above millbase, 36.4 grams of clear solids color solution containing a melamine resin catalyst, non-aqueous dispersion resin and a UV absorber, and 16.3 grams of a balanced clear solid color solution containing a polyester urethane resin were mixed and diluted with a solvent mixture containing 76 parts xylene, 21 parts butanol and 3 parts methanol to a spray viscosity of 20–22 seconds, as measured by a #2 Fisher Cup.

The resulting violet resin/pigment dispersion was sprayed onto a panel twice at 1.5 minute intervals as a basecoat. After 2 minutes, clearcoat resin was sprayed twice at 1½ minute intervals onto the basecoat. The sprayed panel was then flashed with air in a flash cabinet for 10 minutes and then "baked" in an oven at 265° F. (129° C.) for 30 minutes, yielding a violet reddish colored panel, with excellent weatherability.

EXAMPLE 22

1000 grams of polypropylene granules (DAPLEN PT-55®, from Chemie Linz) and 10 grams of the 2,9-dichloroquinacridone pigment obtained in Example 11 were thoroughly mixed in a mixing drum. The granules so obtained were melt spun at 260-28° C. to magenta colored filaments of good light fastness and textile fibers properties.

In addition to the embodiments described above, numerous variations of these embodiments can be made in accordance with this invention, the scope of which should be considered limited only by the language of the appended claims.

What is claimed is:

1. A process for the direct synthesis of a pigmentary grade anthraquinone, phthalocyanine, perinone, perylene, diketopyrrolopyrrole, thioindigo, iminoisoindoline, iminoisoindolinone, quinacridone, flavanthrone, dioxazine, indanthrone, anthrapyrimidine or quinophthalone pigment comprising the step of synthesizing said pigment in the presence of 0.1 to 25 weight percent of a 6,13-dihydroquinacridone derivative of formula I:

(I)

wherein: Q represents a 6,13-dihydroquinacridone moiety of formula II;

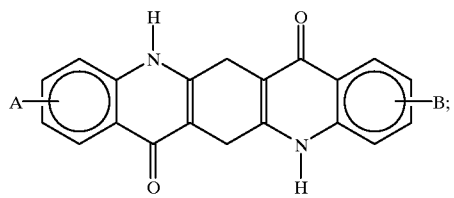

(II)

A and B each independently represent a substituent selected from H, F, Cl, $C_1$-$C_3$alkyl and $C_1$-$C_3$alkoxy M represents a metal cation, quaternary N cation or H; X is an aromatic group, a cyclo-hetero aliphatic group with at least one 5 atom or 6 atom ring or a hetero aromatic group with at least one 5 or 6 atom ring and which is not a phthalimido group; Y is a sulfonic or carboxylic acid or salt thereof; m and n independently from each other represent a number from zero to 2.5; and o is a number from zero to 4, based on the weight of pigment being synthesized, and where m and o are not simultaneously zero.

2. A process for the preparation of a direct pigmentary diketopyrrolopyrrole or quinacridone pigment or a solid solution thereof comprising the step of synthesizing said pigment or solid solution in the presence of 0.5 to 8 percent by weight of a 6,13-dihydroquinacridone derivative of formula I:

(I)

wherein: Q represents a 6,13-dihydroquinacridone moiety of formula II;

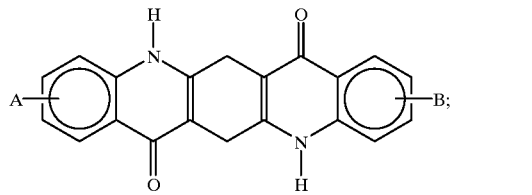

(II)

A and B each independently represent a substituent selected from H, F, Cl, $C_1$-$C_3$alkyl and $C_1$-$C_3$alkoxy M represents a metal cation, quaternary N cation or H; X is an aromatic group, a cyclo-hetero aliphatic group with at least one 5 atom or 6 atom ring or a hetero aromatic group with at least one 5 or 6 atom ring and which is not a phthalimido group; Y is a sulfonic or carboxylic acid or salt thereof; m and n independently from each other represent a number from zero to 2.5; and o is a number from zero to 4, based on the weight of pigment being synthesized, and where m and o are not simultaneously zero.

3. A process for the preparation of a direct pigmentary quinacridone, 2,9-dichloro-quinacridone, 4,11-dichloroquinacridone, 2,9-dimethylquinacridone pigment or a solid solutions thereof comprising the step of synthesizing the said pigment or solid solution thereof in the presence of 0.5 to 8 percent by weight of a 6,13-dihydroquinacridone derivative of formula I:

(I)

wherein: Q represents a 6,13-dihydroquinacridone moiety of formula II;

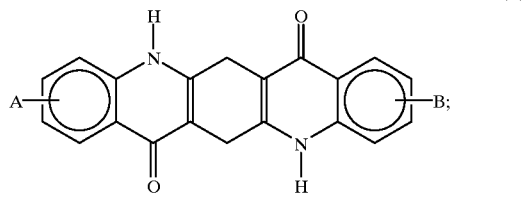

(II)

A and B each independently represent a substituent selected from H, F, Cl, $C_1$-$C_3$alkyl and $C_1$-$C_3$alkoxy M represents a metal cation, quaternary N cation or H; X is an aromatic group, a cyclo-hetero aliphatic group with at least one 5 atom or 6 atom ring or a hetero aromatic group with at least one 5 or 6 atom ring and which is not a phthalimido group; Y is a sulfonic or carboxylic acid or salt thereof; m and n independently from each other represent a number from zero to 2.5; and o is a number from zero to 4, based on the weight of pigment being synthesized, and where m and o are not simultaneously zero.

4. A process for the preparation of a pigmentary anthraquinone, phthalocyanine, perinone, perylene, diketopyrrolopyrrole, thioindigo, iminoisoindoline, iminoisoindolinone, quinacridone, flavanthrone, dioxazine, indanthrone, anthrapyrimidine and quinophthalone pigment comprising a kneading, solvent or aqueous milling finishing step in the presence of 0.1 to 25 weight percent of a 6,13-dihydroquinacridone derivative of formula I:

wherein: Q represents a 6,13-dihydroquinacridone moiety of formula II;

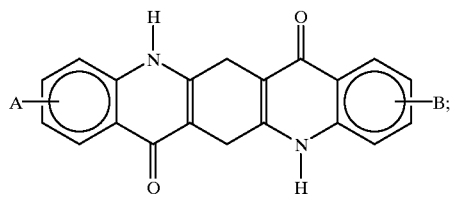

A and B each independently represent a substituent selected from H, F, Cl, $C_{1-C3}$alkyl and $C_{1-C3}$alkoxy M represents a metal cation, quaternary N cation or H; X is an aromatic group, a cyclo-hetero aliphatic group with at least one 5 atom or 6 atom ring or a hetero aromatic group with at least one 5 or 6 atom ring and which is not a phthalimido group; Y is a sulfonic or carboxylic acid or salt thereof; m and n independently from each other represent a number from zero to 2.5; and o is a number from zero to 4, based on the weight of pigment being finished, and where m and o are not simultaneously zero.

5. A process for the preparation of a pigmentary grade anthraquinone, phthalocyanine, perinone, perylene, diketopyrrolopyrrole, thioindigo, iminoisoindoline, iminoisoindolinone, quinacridone, flavanthrone, dioxazine, indanthrone, anthrapyrimidine and quinophthalone pigment comprising a premilling followed by an after treatment step in an organic solvent in the presence of 0.1 to 25 weight percent of a 6,13-dihydroquinacridone derivative of formula I:

wherein: Q represents a 6,13-dihydroquinacridone moiety of formula II;

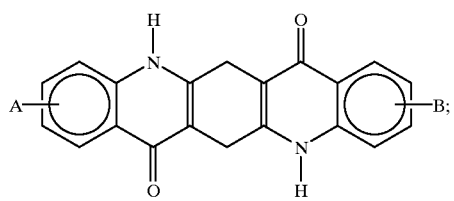

A and B each independently represent a substituent selected from H, F, Cl, $C_{1-C3}$alkyl and $C_{1-C3}$alkoxy M represents a metal cation, quaternary N cation or H; X is an aromatic group, a cyclo-hetero aliphatic group with at least one 5 atom or 6 atom ring or a hetero aromatic group with at least one 5 or 6 atom ring and which is not a phthalimido group; Y is a sulfonic or carboxylic acid or salt thereof; m and n independently from each other represent a number from zero to 2.5; and o is a number from zero to 4, based on the weight of the pigment being finished, and where m and o are not simultaneously zero.

6. A process for the preparation of a pigmentary grade diketopyrrolopyrrole or quinacridone pigment comprising a premilling followed by an after treatment step in an organic solvent in the presence of 0.1 to 25 weight percent of a 6,13-dihydroquinacridone derivative of formula I:

wherein: Q represents a 6,13-dihydroquinacridone moiety of formula II;

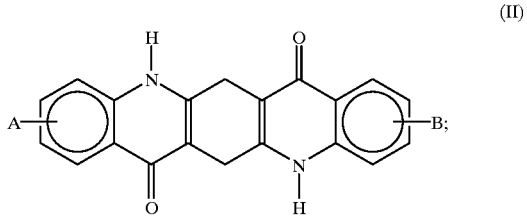

A and B each independently represent a substituent selected from H, F, Cl, $C_{1-C3}$alkyl and $C_{1-C3}$alkoxy M represents a metal cation, quaternary N cation or H; X is an aromatic group, a cyclo-hetero aliphatic group with at least one 5 atom or 6 atom ring or a hetero aromatic group with at least one 5 or 6 atom ring and which is not a phthalimido group; Y is a sulfonic or carboxylic acid or salt thereof; m and n independently from each other represent a number from zero to 2.5; and o is a number from zero to 4, based on the weight of the pigment being finished, and where m and o are not simultaneously zero.

7. A method of improving the heat stability, rheological and flocculant properties of pigment particles comprising adding to said pigment particles at least one compound of formula I:

wherein: Q represents a 6,13-dihydroquinacridone moiety of formula II;

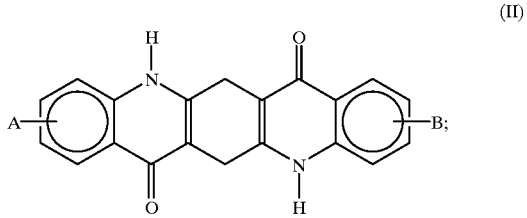

A and B each independently represent a substituent selected from H, F, Cl, $C_{1-C3}$alkyl and $C_{1-C3}$alkoxy M represents a metal cation, quaternary N cation or H; X is an aromatic group, a cyclo-hetero aliphatic group with at least one 5 atom or 6 atom ring or a hetero aromatic group with at least one 5 or 6 atom ring and which is not a phthalimido group; Y is a sulfonic or carboxylic acid or salt thereof; m and n independently from each other represent a number from zero to 2.5; and o is a number from zero to 4 in an amount sufficient to reduce flocculation or improve the heat stability, and where m and o are not simultaneously zero.

8. A process according to claim 1, wherein the substituents A and B of formula II are each H.

9. A process according to claim 1, wherein the metal cation M is sodium, potassium, calcium, magesium or aluminum.

10. A process according to claim 1, wherein X is an aromatic group selected from a 5 carbon or 6 carbon ring or a polycyclic group comprising two to six fused 5 carbon and/or 6 carbon rings.

11. A process according to claim 1, wherein the aromatic group is phenylene, naphthalene, anthracene, phenanthrene, pyrene or perylene.

12. A process according to claim 1, wherein the aromatic group is phenylene or naphthalene.

13. A process according to claim 1, wherein said cyclo-hetero aliphatic group comprises at least one 5 or 6 atom ring.

14. A process according to claim 1, wherein said cyclo-hetero aliphatic group is barbituric acid.

15. A process according to claim 1, wherein said hetero aromatic group which is not a phthalimido group comprises a 5 or 6 atom rings and contains 1 to 4 hetero atoms selected from N, S and/or O.

16. A process according to claim 1, wherein the hetero aromatic group is a pyridine, quinoline, pyrrole, imidazole or pyrazole group.

17. A process according to claim 1, wherein said aromatic, cyclo-hetero aliphatic or hetero aromatic group is optionally substituted with one or more halogen, oxy, hydroxy, imino, amino, $C_{1-C_{18}}$alkoxy or $C_{1-C_{18}}$alkoxy groups.

18. A process according to claim 1, wherein said aromatic, cyclo-hetero aliphatic or hetero aromatic group is optionally substituted with one or more $C_{1-C_3}$alkyl or $C_{1-C_3}$alkoxy groups.

19. A process according to claim 1, wherein said aromatic group is toluene, ortho-meta- or para-xylene, chlorobenzene, ortho- meta- or para-dichlorobenzene, 1- or 2-methylnaphthalene or anthraquinone.

20. A process according to claim 1, wherein said hetero aromatic group is derived from melamine, 1,3,7-trimethylxanthin, hydantoin, 2-methylbenzimidazole, 2,6,8-trihydroxypurine or 2,4-dihydroxyprimidine.

21. A process according to claim 1, wherein said group Y is a free carboxylic acid or sulfonic acid group or a sodium, potassium, magnesium, calcium or aluminum salt thereof.

22. A process according to claim 1, wherein said group Y is a free sulfonic acid group or a sodium, potassium or aluminum salt thereof.

23. A process according to claim 1, wherein m represent a number from zero to 1, n represents a number from zero to 1.2, and o represents a number from zero to 1.5.

* * * * *